United States Patent [19]
Barnett et al.

[11] Patent Number: 5,789,999
[45] Date of Patent: Aug. 4, 1998

[54] DISTRIBUTED LOSSY CAPACITIVE CIRCUIT ELEMENT WITH TWO RESISTIVE LAYERS

[75] Inventors: Ron Barnett, Santa Rosa, Calif.; John F. Casey, Colorado Springs, Colo.

[73] Assignee: Hewlett-Packard Company, Palo Alto, Calif.

[21] Appl. No.: 743,442

[22] Filed: Nov. 1, 1996

[51] Int. Cl.⁶ .................................................. H03H 1/02
[52] U.S. Cl. ................. 333/172; 333/81 A; 361/275.3; 361/766
[58] Field of Search .................... 333/172, 81 A, 333/12; 361/275.3, 766, 782, 799, 811; 174/251, 253, 32, 33

[56] References Cited

U.S. PATENT DOCUMENTS

| | | | |
|---|---|---|---|
| 1,621,058 | 3/1927 | Burger | 361/275.3 X |
| 3,200,326 | 8/1965 | Pritikin et al. | 361/275.3 X |
| 4,408,170 | 10/1983 | Rapeli et al. | 333/172 |
| 4,622,527 | 11/1986 | Carlson | 333/12 X |
| 4,816,614 | 3/1989 | Baigrie et al. | 333/12 X |
| 5,561,586 | 10/1996 | Tomohiro et al. | 333/172 X |

OTHER PUBLICATIONS

Ohr, "Circular Design Improves Trim Factors of Thick-Film Resistors", Electronic Design 3, vol. 28, pp. 33, Feb. 1980.

Primary Examiner—Robert J. Pascal
Assistant Examiner—Justin P. Bettendorf
Attorney, Agent, or Firm—John L. Imperato

[57] ABSTRACT

A lossy capacitive circuit element, or DC scrubber, is printed on a circuit substrate and absorptively filters high frequency signals in circuit modules. A top conductor of the DC scrubber is separated from a ground conductor by a layer of high dielectric material. A resistive layer, positioned either above or below the top conductor absorbs high frequency signals applied to the top conductor while the dielectric layer shunts the signals to the ground conductor. Alternatively, a pair of DC scrubbers are stacked vertically to configure the lossy capacitive structures in parallel. Signal isolation provided by the DC scrubber and the stacked DC scrubber enables inexpensive DC interfaces to be used in the circuit modules.

5 Claims, 6 Drawing Sheets

DISTRIBUTED LOSSY CAPACITIVE CIRCUIT ELEMENT WITH TWO RESISTIVE LAYERS

FIELD OF THE INVENTION

The present invention relates to DC interfaces for high frequency circuit modules and, more particularly, to a lossy capacitive circuit element that absorptively filters high frequency signals.

BACKGROUND OF THE INVENTION

Convenient and cost effective access to the information superhighway depends on high frequency circuit modules that have low manufacturing cost and small size. As integrated circuits and other components used in the circuit modules decrease in size and cost, the DC interface used to connect the circuit modules to external signal paths increasingly influences the modules' size and manufacturing cost. While the DC interface is chosen to meet signal isolation requirements for the circuit module, it directly effects the physical size and the manufacturing cost of the module.

One type of DC interface for a circuit module uses capacitive feedthroughs to shunt high frequency signals to a ground. The feedthroughs rely on a milled or casted metal package to capture the feedthrough and provide the ground to which the signals are shunted. The metal packages are expensive and must be large enough to accommodate the physical size of the feedthrough. In addition, the feedthroughs are nonabsorptive and reflect high frequency signals, making circuit modules susceptible to bias supply line oscillations.

SUMMARY OF THE INVENTION

In accordance with the preferred embodiment of the present invention, a lossy capacitive circuit element, or DC scrubber, enables the use of conductive tabs, lead frames, pin grid arrays or other types of small, low cost interfaces in circuit modules, enabling the modules to have low manufacturing cost and small size. The DC scrubber attenuates high frequency signals between its input and output ports, reducing reliance on elaborate packages or expensive DC interfaces to isolate high frequency signals in circuit modules. The DC scrubber is readily printed on a circuit substrate using known techniques. A top conductor in the DC scrubber has multiple tapered sections and is separated from a ground conductor by a layer of high-dielectric material. A resistive layer is adjacent to the top conductor, positioned either above or below the top conductor, to dampen high frequency resonances induced by the tapered sections. The dielectric layer shunts high frequency signals to the ground conductor while the resistive layer absorbs the signals, thus minimizing signal reflections and bias supply line oscillations. In an alternate preferred embodiment of the present invention, a pair of DC scrubbers are stacked vertically to form a stacked DC scrubber. The stacked DC scrubber provides further high frequency signal isolation and may be shielded using a printed conductive shield.

DETAILED DESCRIPTION OF THE PREFERRED EMBODIMENT

Figure 1:
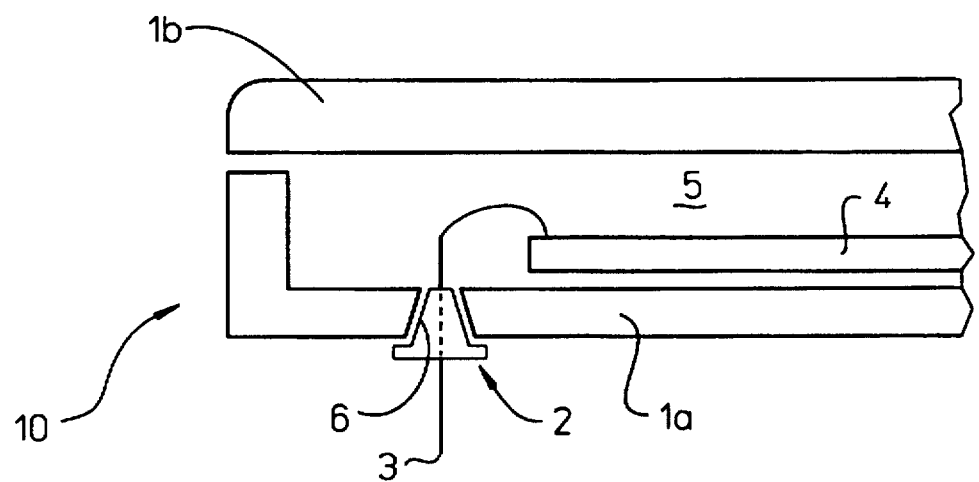
FIG. 1 is a prior art interface to a circuit module using a DC feedthrough.

FIG. 1 is a prior art DC interface to a circuit module 10 incorporating a capacitive DC feedthrough 2. The DC interface shunts high frequency signals on a centerpin 3 to a conductive package 1a. DC and low frequency signals are coupled between an internal circuit substrate 4 and external signal traces (not shown) through the centerpin 3. The feedthrough 2 contains an internal capacitor (not shown) that connects between the center pin 3 and a center portion 6 that is pressed into the package 1a. The feedthrough 2 relies on the package 1a to provide a ground for the circuit module 10. Whether the high frequency signals originate external or internal to the circuit module 10, they are bypassed to the package 1a via the internal capacitor of the feedthru 2.

Typically, the package 1a is fabricated from metal that is milled or cast to accommodate the center portion 6 of the feedthru 2. The fabrication of the package 1a and the added manufacturing step of pressing the DC feedthru 2 in the package 1a, cause this type of DC interface to have a high manufacturing cost. The cost may further increase if the circuit module 10 is hermetically sealed to protect circuitry on the inside 5 of the module 10. A hermetic seal is then needed, not only between the package 1a and lid 1b, but also between the feedthrough 2 and the package 1a. The package 1a must be physically large enough to accommodate the size of the feedthrough 2, adding to the size of the circuit module 10.

Figure 2:
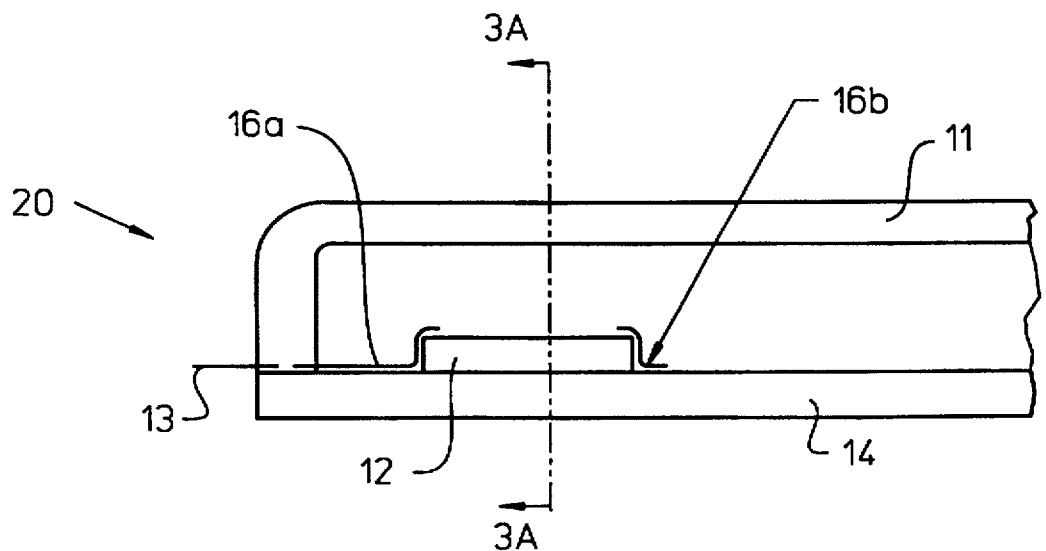
FIG. 2 is an interface to a circuit module using a DC scrubber constructed according to the preferred embodiment of the present invention.

FIG. 2 shows a DC interface to a circuit module 20 incorporating a DC scrubber 12 that is constructed according to the preferred embodiment of the present invention. The DC scrubber 12 is integrated directly onto a circuit substrate 14 of a circuit module 20. Conductive tabs 13, or a lead frame (not shown), pin grid array (not shown), or other type of low cost interface may be used to connect external signal traces to the circuit substrate 14. DC and low frequency signals applied to the DC scrubber 12 are filtered and free from high frequency signals. The DC scrubber isolates high frequency signals between ports 16a, 16b. High frequency signals present on one port 16a of the DC scrubber 12 are absorptively filtered as the signals propagate to the opposite port 16b of the DC scrubber 12. High frequency signals, which may be superimposed on either the DC signals or low frequency signals present at the conductive tab 13, are absorptively filtered by the DC scrubber 12 before reaching circuit elements (not shown) on the circuit substrate 14. Similarly, high frequency signals within the circuit module 20 present at port 16b are absorptively filtered by the DC scrubber 12 before reaching the opposite port 16a coupled to the conductive tab 13. This absorptive filtering reduces high frequency signal emissions from the circuit module 20, reduces susceptibility to interference from high frequency signals, and dampens oscillations on signal traces (not shown) routed to the circuit module 20. Costly metal packages are not relied upon to provide ground for the DC scrubber 12, and the DC scrubber has a small physical size, enabling a low cost circuit module 20 to be formed by attaching a lid 11 directly to the circuit substrate 14.

Figure 3:
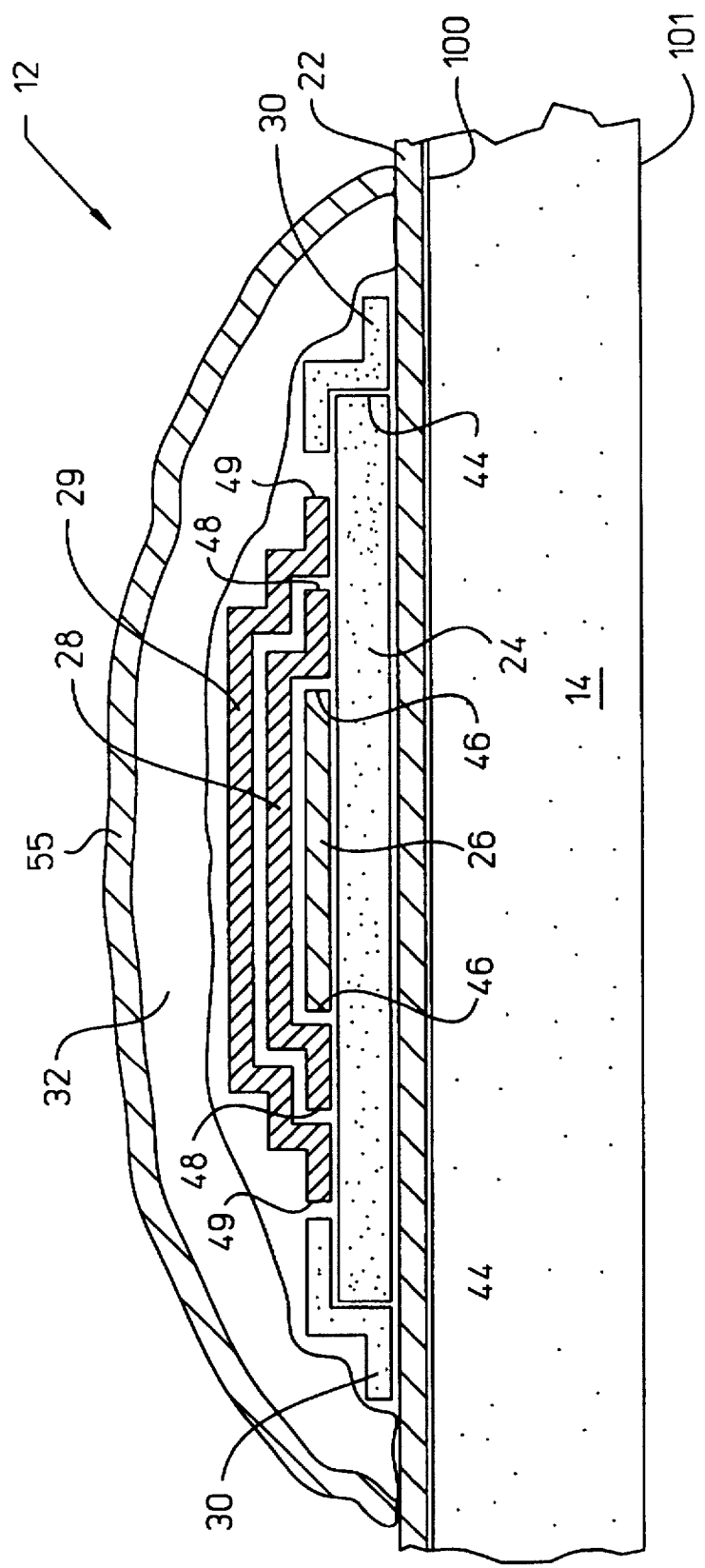
FIG. 3 is a detailed cross-sectional view of the DC scrubber shown in FIG. 2.

FIG. 3 is a detailed cross-sectional view of the DC scrubber 12 shown in FIG. 2. The DC scrubber 12 is printed on circuit substrate 14 formed from sapphire, epoxy-glass, alumina or other material upon which it is suitable to create conductive, dielectric and resistive layers. In this example, the circuit substrate 14 is 96% alumina that is 0.040" thick. The DC scrubber 12 and other circuit elements such as resistors, capacitors, and transmission line conductors are deposited on the circuit substrate 14 using known thick film processing techniques. Other types of processes, such as subtractive processes or thin film processes, may also be used to fabricate the structure of the DC scrubber 12. In this example, the DC scrubber 12 is fabricated using thick film processing, and is therefore, fabricated additively, starting with a ground conductor 22. The ground conductor 22, which is about 0.0003" thick, is shown printed on the top surface 100 of circuit substrate 14, but it may be connected to other grounds in the circuit module 20, such as a bottom ground plane (not shown) located on the bottom surface 101 of the circuit substrate 14. Connections between the ground conductor 22 and a bottom ground plane may be provided by conductive via holes (not shown) through the substrate extending between the top surface 100 and the bottom surface 101, or conductive wrap-arounds (not shown) on the edge of the circuit substrate 14. Signals within the DC scrubber 12 are referenced to the ground conductor 22.

A dielectric layer 24 is deposited on top of the ground conductor 22. The dielectric layer 24 is about 0.002" thick and is formed from dielectric composition materials such as those commercially available from Dupont Corporation. The relative dielectric constant of the dielectric layer 24 is approximately 1200, which is substantially higher than the relative dielectric constant of the circuit substrate 14. High dielectric material for the dielectric layer 24 is chosen to provide high capacitance even though the thickness of the dielectric layer 24, nominally 0.002", varies according to the thickness tolerance of the thick film processing techniques. For example, a DC scrubber 12 having a length of approximately 0.30" and a width of approximately 0.15" may have a capacitance of approximately 1000 pF, which is enough capacitance to bypass high frequency signals within a frequency range of interest.

An optional insulating frame 30 made of glass or another type of insulating material is then formed around the perimeter 44 of the dielectric layer 24 to seal exposed edges of the dielectric layer 24 from moisture and chemical contaminants that may effect the integrity of the dielectric layer 24. The frame 30 enables input and output signal traces 18a, 18b to connect to the ports 16a, 16b of a top conductor 26 (shown in FIG. 4) without shorting to the ground conductor 22. The frame 30 helps prevent layers subsequently deposited above the dielectric layer 24 from inadvertently shorting to the ground conductor 22.

Figure 4:
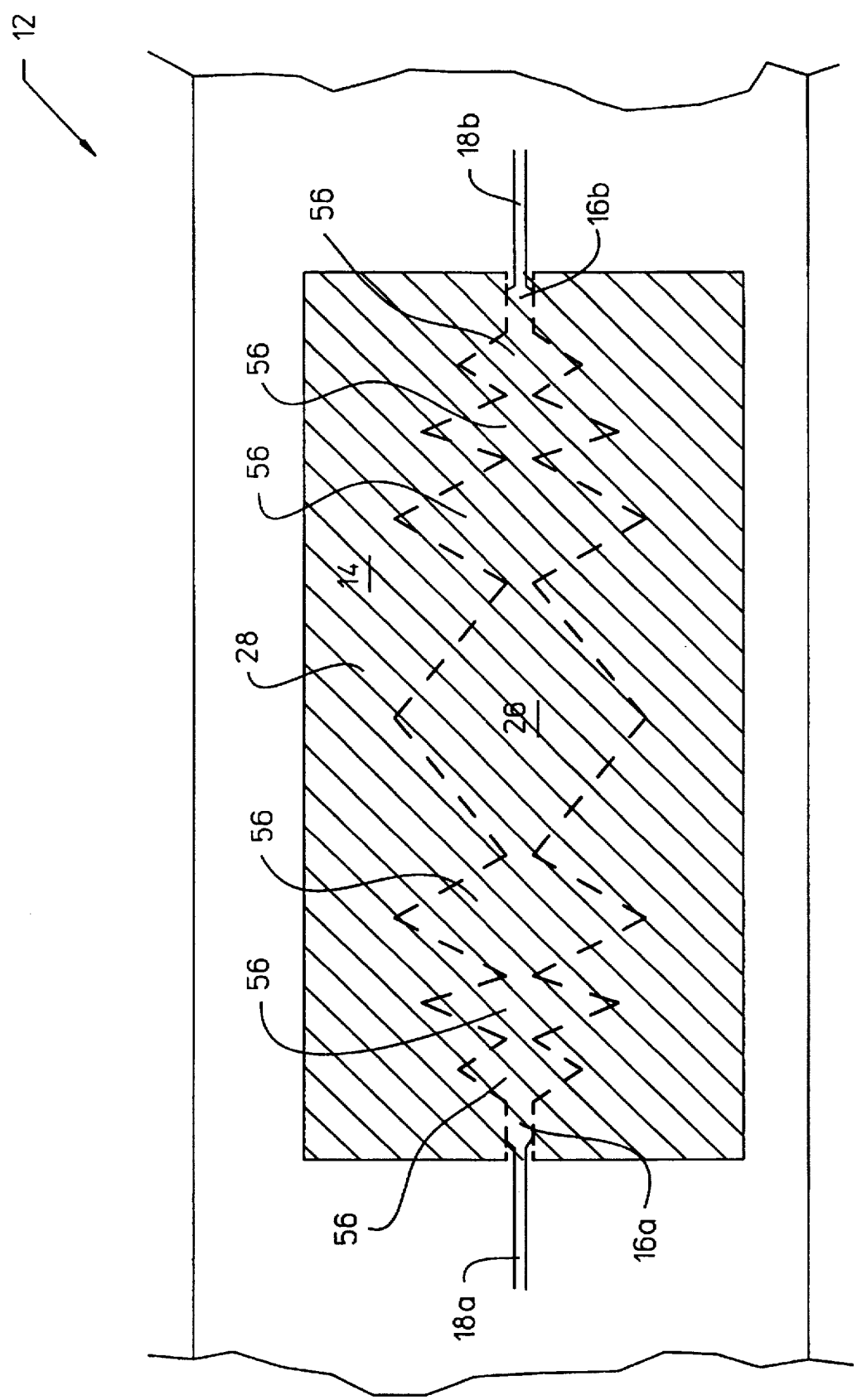
FIG. 4 is a detailed top view of the DC scrubber shown in FIG. 2.
Figure 7:
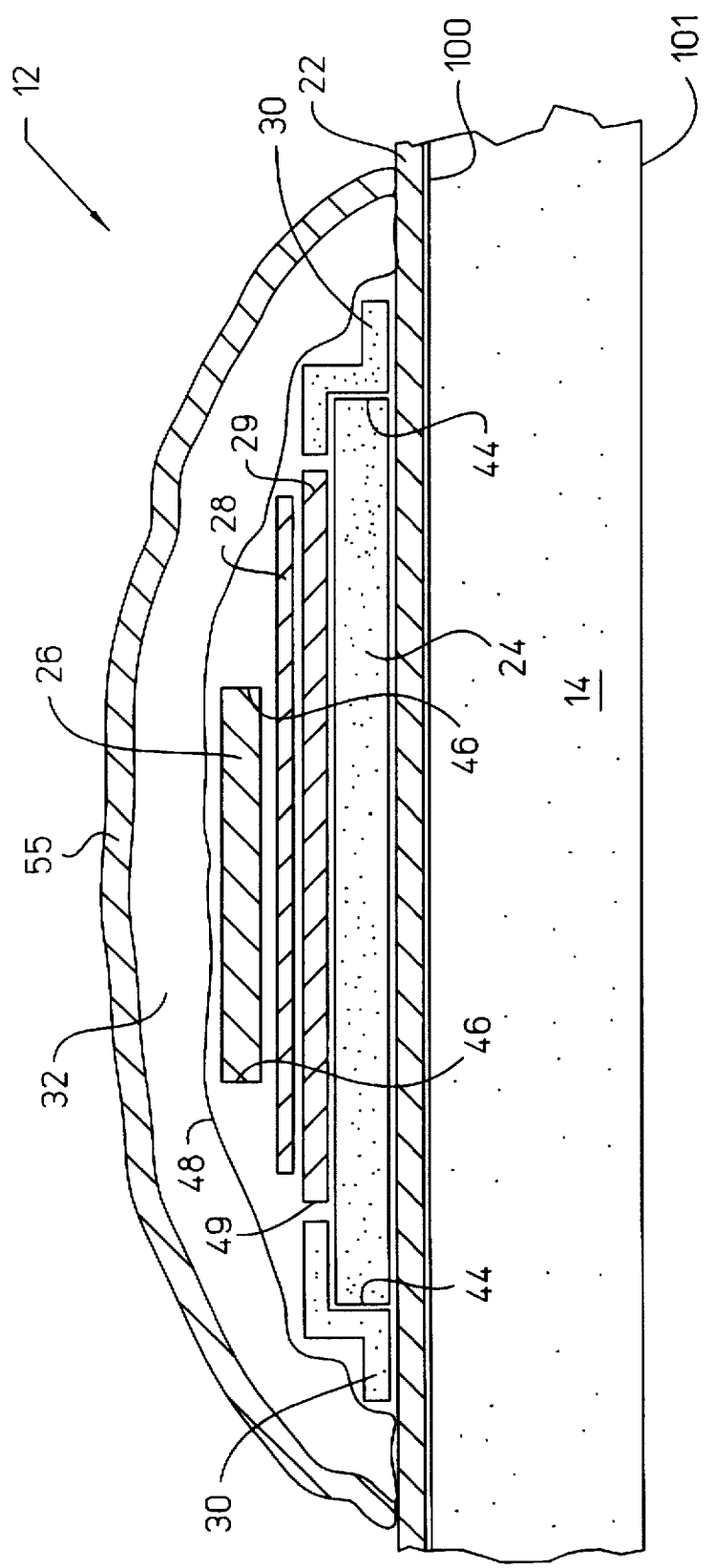
FIG. 7 is an alternative detailed cross-sectional view of the DC scrubber shown in FIG. 2.

The top conductor 26 is about 0.0003" thick and is deposited on the dielectric layer 24 to complete a capacitive structure formed by the ground conductor 22, the dielectric layer 24 and the top conductor 26. The top conductor 26 has sufficient area to provide enough total capacitance to enable high frequency signals present on the top conductor 26 to be shunted to the ground conductor 22. Due to the high relative dielectric constant of the dielectric layer 24 formed below the top conductor 26, resonances are formed within the physical dimensions of the top conductor 26. To prevent a strong resonance at any particular frequency, the top conductor 26 has multiple tapered sections 56 as shown in FIG. 4, which is a top view of the DC scrubber 12 of FIG. 3. The tapered sections 56 support resonances over a wide frequency bandwidth which are dampened by a resistive layer 28 that absorbs the energy of the resonances. As shown in FIG. 3, the resistive layer 28 is deposited on the top conductor 26. The resistive layer 28 has a sheet resistance that is chosen to achieve the desired absorption for the DC scrubber 12. A second resistive layer 29 can also be deposited on top of the first resistive layer 28 as shown. The first resistive layer 28 is about 0.0007" thick and has a sheet resistance of approximately 3 ohms per square and is deposited on the top conductor 26. The second resistive layer 29 has a sheet resistance of approximately 30 ohms per square and is deposited about 0.0007" thick on top of the first resistive layer 28. Alternatively, the resistive layer 28 (and second resistive layer 29, if present) is formed between the dielectric layer 24 and the top conductor 26 as shown in FIG. 7. Although two resistive layers 28, 29 are shown, one, two or more resistive layers can be deposited to tailor the absorptive characteristics of the DC scrubber 12. The resistive layers 28, 29 may be formed from resistive composition commercially available from Dupont Corporation.

The insulating frame 30 is shown contacting both the ground conductor 22 and the dielectric layer 24 simultaneously but the frame 30 may also be deposited on either the dielectric layer 24 or the ground conductor 22, as long as the frame 30 electrically isolates the top conductor 26, and the resistive layers 28, 29 from the ground conductor 22. The frame 30 may also be eliminated if the dielectric layer 24, the top conductor 26 and the resistive layer 28, 29 are deposited so as to avoid shorting any of these layers to the ground conductor 22.

The insulating frame 30 encircles the perimeter 46 of top conductor 26, insulating the top conductor 26 from ground conductor 22. The perimeter 46 of the multiple tapered sections 56 of top conductor 26 is contained within the perimeter 44 of the dielectric layer 24 below, to isolate the top conductor 26 from the ground conductor 22. The resistive layers 28, 29 have perimeters 48, 49, respectively, that lie within the perimeter 44 of the dielectric layer 24 so as to not contact the ground conductor 22.

An optional encapsulant 32 is then deposited over the resistive layer 28, 29 covering the layers of the DC scrubber 12 and contacting the ground conductor 22. The encapsulant 32 which may be glass, potting material, or another type of insulator, seals and protects the conductive, resistive and dielectric layers from the operating environment of the circuit module and protects the DC scrubber 12 from humidity or chemical contaminants that may degrade the DC scrubber's performance or reliability. If the encapsulant 32 is used, a shield 55 may be printed to cover the encapsulant 32. The printed shield 55 is conductive and contacts the ground conductor 22 to shield the DC scrubber 12 from external signals or to prevent signals internal to the DC scrubber 12 from radiating. When the DC scrubber 12 is used in a hermetically sealed circuit module or is otherwise shielded from humidity and contaminants, the encapsulant 32 is typically omitted without jeopardizing the performance or reliability of the DC scrubber 12.

FIG. 4 shows a top view of the DC scrubber 12. Ports 16a, 16b provide electrical connections between the top conductor 26 and input/output (I/O) signal traces 18a, 18b. The ports 16a, 16b are formed by successively recessing the layers of the DC scrubber 12 that are printed above the top conductor 26, so as to leave a portion of the top conductor 26 exposed, enabling electrical contact between the ports 16a, 16b of the top conductor 26 and I/O signal traces 18a, 18b, wirebonds or other circuit elements. The I/O signal traces 18a, 18b may also be integrated directly with the ports 16a, 16b by printing the I/O signal traces continuously and concurrently with the top conductor 26.

Figure 5:
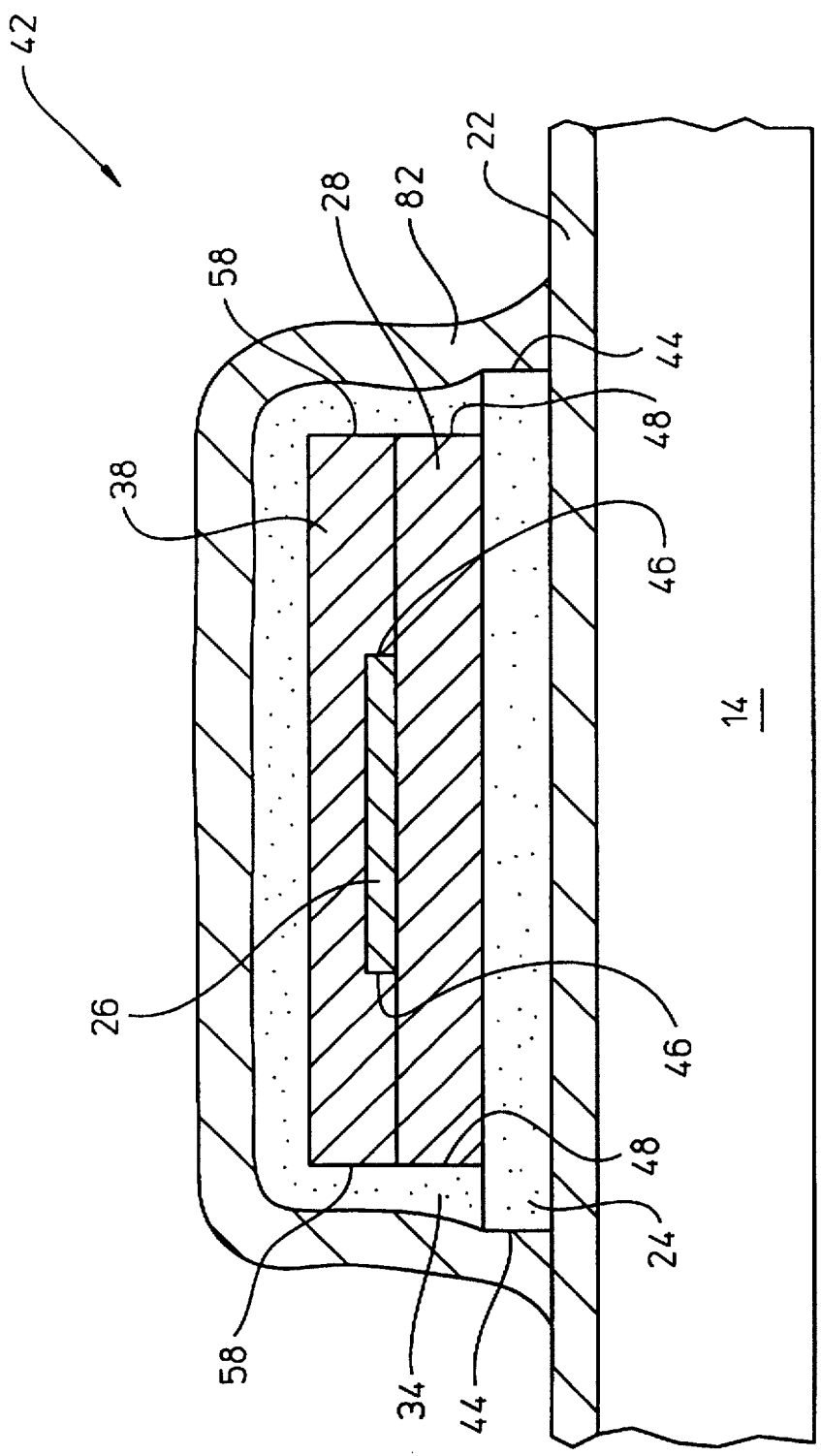
FIG. 5 is a cross-sectional view of a stacked DC scrubber constructed according to an alternate preferred embodiment of the present invention.

Two or more DC scrubbers 12 may be connected in parallel to increase the capacitance of the DC scrubber 12. For example, DC scrubbers may be printed side by side on the circuit substrate 14 and connected in parallel. FIG. 5 shows an alternate preferred embodiment of the present invention in which a pair of DC scrubbers are stacked vertically on the circuit substrate 14, increasing the capacitance per unit area of circuit substrate 14. In this alternate embodiment, the resistive layer 28 is printed below the top conductor 26. A top resistive layer 38, a top dielectric layer 34, and top ground conductor 82 are subsequently printed above the top conductor 26 to create a stacked DC scrubber 42 on the circuit substrate 14. The stacked DC scrubber 42 has a structure that is approximately symmetrical about the top conductor 26. The resistive layer 28 and the top resistive layer 38 overlap and contact each other outside of the perimeter 46 of the top conductor 26 to form a resistive coating, encasing the top conductor 26. The dielectric layer 24 and the top dielectric layer 34 overlap and contact each other outside of the perimeter 48 of resistive layer 28 and perimeter 58 of top resistive layer 38 to form a dielectric coating, encasing the resistive coating. The ground conductor 22 and the top ground conductor 82 overlap and contact each other outside the perimeter 44 of the dielectric layer 24 and top dielectric layer 34 to form a conductive shield, encasing the dielectric coating. The top conductor 26 and the resistive layer 28 and top resistive layer 38 are isolated from the ground conductor 22 and the top ground conductor 82 by dielectric layers 24, 34. An optional encapsulant (not shown) made from glass, potting material, or other sealants can be deposited over the stacked DC scrubber 42 to seal the top ground conductor 32 and other layers within the stacked DC scrubber 42.

Figure 6:
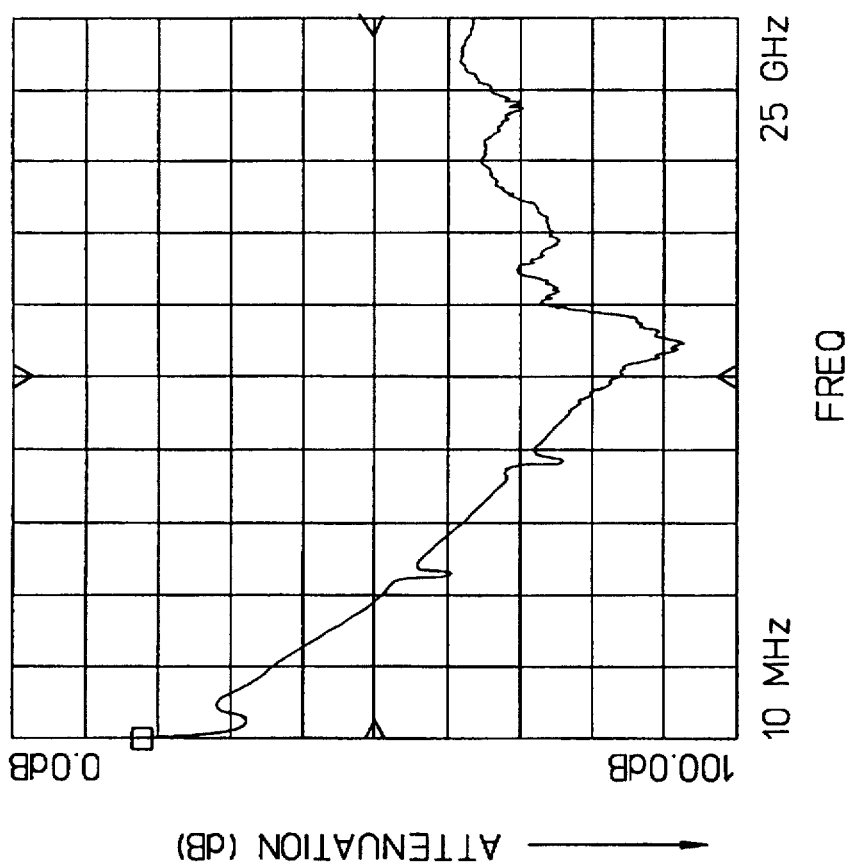
FIG. 6 shows the attenuation of signals applied to the DC scrubber versus the signal frequency.

FIG. 6 shows signal attenuation in decibels (dB) versus signal frequency between ports 16a, 16b of the DC scrubber 12. Over a frequency range of interest, the attenuation of signals applied to the DC scrubber 12 increases as the frequency of the applied signal increases. High frequency signals have high attenuation and are isolated between the input and output ports 16a, 16b of the DC scrubber 12. DC and low frequency signals have low attenuation between ports 16a, 16b.

What is claimed is:

1. A lossy capacitive circuit element for attenuating high frequency signals between an input signal trace and an output signal trace, comprising:

a planar substrate;

a conductive ground printed on a top surface of the planar substrate;

a dielectric layer printed on the conductive ground;

a top conductor disposed over the dielectric layer, having a first connection port coupled to the input signal trace and having a second connection port coupled to the output signal trace; and a first resistive sheet having a first resistance per unit area and a second resistive sheet having a second resistance per unit area adhered to the top conductor and isolated from the conductive ground.

2. The lossy capacitive circuit element of claim 1 further comprising an insulating encapsulant covering the dielectric layer, the first resistive sheet, the second resistive sheet and the top conductor.

3. The lossy capacitive circuit element of claim 2 further comprising a shield layer printed on the encapsulant and contacting the conductive ground.

4. The lossy capacitive circuit element of claim 1 wherein the first resistive sheet and the second resistive sheet are above the top conductor.

5. The lossy capacitive circuit element of claim 1 wherein the first resistive sheet and the second resistive sheet are between the dielectric layer and the top conductor.

* * * * *